Figure 1:
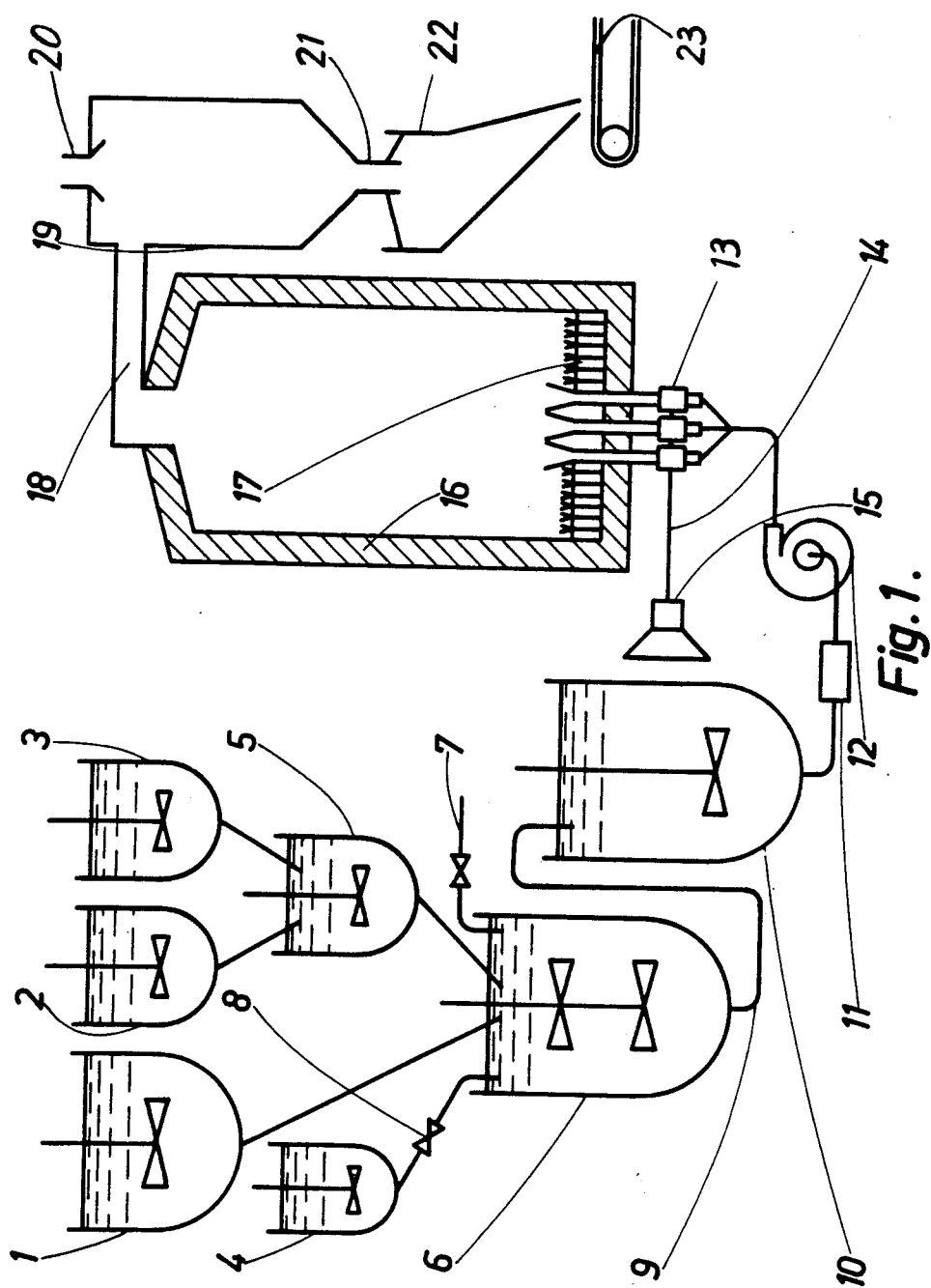

United States Patent [19]

De Vos et al.

[11] 4,063,916
[45] Dec. 20, 1977

[54] PROCESS OF MAKING GLASS BEADS FROM LIQUID MEDIUM FEEDSTOCK

[75] Inventors: Daniel De Vos, Jette; Paul-Marie Michel, Jumet; Alfred Berger, Jamioulx, all of Belgium

[73] Assignee: Sovitec S.A., Charleroy, Belgium

[21] Appl. No.: 737,344

[22] Filed: Nov. 1, 1976

[30] Foreign Application Priority Data

Nov. 13, 1975 United Kingdom ............... 46919/75

[51] Int. Cl.² ............................................. C03B 19/10
[52] U.S. Cl. ............................................. 65/21; 65/22; 106/40 V; 106/75; 264/14; 264/43
[58] Field of Search ............... 65/21, 22; 106/40 V, 106/74, 75; 264/14, 15, 43

[56] References Cited

U.S. PATENT DOCUMENTS

| 2,978,340 | 4/1961 | Veatch et al. | 106/40 V |
| 3,699,050 | 10/1972 | Henderson | 65/21 X |
| 3,838,998 | 10/1974 | Matthews et al. | 65/21 |

*Primary Examiner*—Robert L. Lindsay, Jr.
*Attorney, Agent, or Firm*—Cushman, Darby & Cushman

[57] ABSTRACT

A process of making glass beads which comprises the steps of forming a fluid medium comprising an aqueous liquid having glass-forming material therein at least most of which is dissolved in the aqueous liquid, forming drops of such fluid medium, and converting the drops to glass beads by causing the drops to travel in separated condition first through a firing zone at glass-forming temperature to cause evaporation of liquid and formation of glass from the glass-forming material, and then through a cooling zone to cause the glass to solidify.

19 Claims, 2 Drawing Figures

PROCESS OF MAKING GLASS BEADS FROM LIQUID MEDIUM FEEDSTOCK

This invention relates to a process of making glass beads by forming a feedstock containing glass-forming material and subjecting small quantities of such feedstock to heat treatment to convert them into glass beads. The invention also relates to feedstock compositions suitable for use in such process, and to glass beads formed thereby.

Various processes are known for making glass beads. In one known process a supply of molten glass is divided into drops which are projected through a cooling zone in which they solidify. This process involves the mechanical handling of a molten glass feedstock, for which expensive apparatus is required. It is technically difficult to project a continuous flow of molten glass in the form of small drops. The higher the glass temperature the more severe are the demands made on the construction and maintenance of the apparatus. The lower the molten glass temperature the more difficult it is to form drops of controlled size and to achieve reasonably high production rates. The known process is moreover not capable of producing glass beads which are of cellular form.

It is also known to produce glass beads from pellets or fragments of a solid feedstock which can be prepared at temperatures well below glass melting temperatures. In some cases pellets are molded at elevated temperatures from a mixture incorporating powdered glass. In other cases fragments of a solidified composition incorporating glass-formers are prepared by a sequence of steps preparatory to being converted to glass beads. The numerous steps involved in the preparation of the feedstock in such prior processes makes them very laborious and such preparation requires quite expensive apparatus.

In addition to being complex and expensive, the processes above described using a pelletized or fragmented solid feedstock suffer from the limitation that they are not capable of producing extremely small glass beads such as are now occasionally in demand for various industrial purposes.

It is an object of the present invention to provide a process whereby, starting from a glass-former composition, glass beads can be more easily prepared. A further object of the invention is to provide a process wherein high production rates can be achieved in plant of relatively small scale, using a single furnace. Yet a further object is to provide a process which can easily be carried out so as to produce cellular glass beads of very small sizes.

According to the present invention, a process of making glass by forming a feedstock containing glass-forming material, and subjecting small quantities of such feestock to heat treatment to convert them into glass beads, is characterized in that the feedstock is prepared as a fluid medium comprising an aqueous liquid in which all or most of the glass-forming material is dissolved, and drops of such fluid medium are converted to glass beads by causing the drops to travel in separated condition first through a heating zone at glass-forming temperature to cause evaporation of liquid and formation of glass from the glass-forming material, and then through a cooling zone to cause the glass to solidify.

This process is much more easily performed than the previously known precesses hereinbefore described. The formation of drops of a fluid feedstock of suitable composition can be achieved at room temperature and does not require elaborate processing steps. Various useful glass formers can be dissolved in water or other aqueous media to form a solution. Conventional mixing apparatus can be used in the formation of the feedstock. The formation of the feedstock into drops can be achieved very easily by spraying. Very high production rates can be achieved.

Another important advantage of the invention is that cellulated beads can be produced in various predetermined sizes, including sizes below the minimum attainable by the prior processes. The production of such beads does not entail complication of the process or apparatus. All that is required is control of certain processing conditions, as will hereafter be explained.

For the purposes in view the fluid medium should be of low viscosity. Preferably the fluid medium comprises at least 60% by weight of water. Such compositions are highly fluid and by reason of this fact they can very easily be divided into drops, even drops of very small sizes, e.g. substantially below 1 mm in diameter.

Glass-forming material or so-called "batch" compositions of well-known types can be used in carrying out the invention. Such compositions usually comprise one or more glass network formers, glass modifiers, and one or more stabilizers. The glass forming material may comprise a product (glass-former) which is in itself vitrifiable by firing. Alternatively the fluid medium may contain in dissolved state separate glass formers which react together to form a said vitrifiable reaction product when the temperature of the composition is raised to a certain level. It is preferable for the entire glass former or batch composition, including any glass modifier and stabilizer which may be present, to be in solution in the liquid. It is however within the scope of the invention to prepare and use a feedstock wherein a certain amount of the glass-forming material, e.g. a proportion of one or more ingredients thereof, is in undissolved state. From this explanation it will be understood that the term "fluid medium" as used in defining the process according to the invention includes a medium containing solid particles in suspension in the liquid. However it is preferable to employ a medium wherein suspended particles (if any) are of colloidal size. Such media remain homogenous without agitation or stirring.

In certain processes according to the invention the fluid medium forming the drops includes one or more glass formers for forming a borosilicate or silicoborate glass. Such glass-forming material may comprise sodium silicate and a boron-containing compound or a reaction product of such substances. Borosilicate and silicoborate glasses are particularly well adapted for forming glass beads for use in manufacturing a range of different industrial products. In preparing the fluid medium constituting the feedstock, sodium silicate and a boron-containing compound reactive therewith may be employed in relative proportions selected according to the eventual glass composition required, as in conventional glass manufacture.

The process according to the invention is of course not restricted to the production of beads of borosilicate or silicoborate glasses. As a further example, the fluid medium forming the drops may contain a glass former or glass formers which is or are converted by the firing step to an alumino-silicate glass. The fluid medium may e.g. contain an aluminum compound as one of two reactant glass formers. Such compound may be in colloidal solution in the liquid phase.

In preferred embodiments of the invention, the fluid medium forming the drops contains one or more dissolved glass formers which would normally form a gel, but also includes a dissolved ingredient or ingredients which inhibit such gel formation. Such fluid media are recommended because generally speaking glass formers which form a gel in water lead to glasses which have the most satisfactory properties for use in various industrial products. By incorporating a substance which inhibits gel formation, considerable advantages are achieved. The preparation of the fluid medium can take place in advance of the formation of the drops without it being necessary to resort to substantial heating or agitation to form and maintain the medium in fluid condition.

For achieving the best results, the fluid medium contains products of reaction of an alkali metal silicate, e.g., sodium silicate, an acidic boron-containing compound e.g. boric acid ($H_2BO_3$), boric anhydride ($B_2O_3$) or borax ($Na_2B_4O_7.10H_2O$) and a pH modifier which inhibits gel formation. Such reaction products are precursors of borosilicate and silocoborate glasses. By way of example, the fluid medium may be one obtained by addition of sodium silicate to neutralized boric acid solution, the boric acid being used in a proportion by weight of more than 25% with respect to the weight of the anhydrous silicate.

Preferably one or more alkali metal hydroxides, e.g. sodium or potassium hydroxide, is used as neutralizing agent in preparing the fluid medium. Such hydroxides have properties which make them particularly suitable. The most favored neutralizing agent is sodium hydroxide. Such compound can be used as such in the preparation of the feedstock. Alternatively the sodium hydroxide can be formed in situ in the fluid medium by reaction between other ingredients, e.g. sodium carbonate and calcium hydroxide.

In the firing stage of the process the evaporation of the water vapor creates pressures which generally result in the formation within the individual drops, of cells which become "frozen-in" during the cooling stage so that the corresponding glass beads are of cellular form, whether unicellular or multicellular.

Whether or not such cellular beads are formed depends on a number of different parameters. The influential factors, which will be referred to again later in this specification, include the firing conditions and the composition of the feedstock itself. Assuming cellulation to be a desired result in a given case, its attainment can be encouraged at the feedstock preparation stage by including in the feedstock one or more solid or dissolved substances giving rise to the evolution of gas in the firing zone. The invention includes processes wherein the fluid medium contains such a substance or combination of substances. In some cases the fluid medium contains such a substance which decomposes or burns in the firing zone. In other cases the fluid medium contains substances which react under the temperature conditions in the firing zone, with evolution of gas.

In certain processses according to the invention, a metal carbonate is present in the feedstock. Metal carbonates are very suitable gas-evolving substances. A very satisfactory way in which to form a medium comprising such a metal carbonate and caustic soda as pH regulator is to employ sodium carbonate and slaked lime as ingredients in the preparation of the fluid medium. These ingredients react to form sodium hydroxide and calcium carbonate, the latter substance forming a disperse phase in the aqueous liquid. During firing to glass-forming temperatures, gas is evolved due to decomposition of the carbonate and the caustic soda and calcium carbonate yield $Na_2O$ an CaO which participate in and favorably influence the formation of the glass. In this example the suspended calcium carbonate in the feedstock accordingly seves both as a glass former and as a cellulating agent.

Another very satisfactory gas evolving substance is urea. The invention includes processes in which the fluid medium contains urea. This gas former is available at low price.

The fluid medium constituting the feedstock may incorporate in addition to the ingredients hereinbefore referred to, any other ingredient, compatible therewith and with the formation of the glass beads, for improving the process or the product.

In one advantageous way of forming the drops of fluid medium which are converted to glass beads, the fluid medium is fed to one or more sprayers from which the fluid medium issues in drops. The subdivision of the fluid medium into drops can be assisted by the action of one or more gas streams.

In some processes according to the invention the fluid medium is actually formed in the form of drops by delivering separate fluid streams containing different constituents of the fluid medium into one or more gas streams in which the materials of the different fluid streams coalesce in the form of drops. This latter procedure affords special advantages if the drops are to be formed of a fluid medium which if it were pre-formed would need to be kept at elevated temperature and/or in agitated or stirred condition to avoid precipitation or gel formation such as would prevent the medium from being formed into drops in the required manner. By forming the medium ab initio in the form of drops as above referred to, the need for such pre-heating or stirring can be obviated.

The sizes of the drops can be easily controlled for producing beads of required sizes. Preferably the drops are entirely or substantially entirely of a size not exceeding 2 mm in diameter. It is very satisfactory to form drops in the size range 0.01 to 1.0 mm. The formation of such small drops is easily accomplished due to the physical nature of the fluid medium, particularly if it comprises a very dilute solution as hereinbefore recommended.

The drops of fluid medium may be projected into one or more gas streams whereby they are kept in separated condition while the glass-forming material becomes converted to glass and whereby the resulting vitreous drops are carried into a cooling zone where they solidify sufficiently to allow them to come into contact with each other without mutual adherence.

The structure of the beads on solidification is influenced by the temperature/time curve during the heat treatment of the drops and the chemical nature of the glass-forming composition. The higher the viscosity of this composition at any given moment, the higher is its resistance to flow under the influence of gas pressure generated by evaporation of the solvent and/or by decomposition of any gas former such as a urea which may be present. Preferably the temperature in the firing zone corresponds with a glass viscosity of the order of 10,000 centipoises e.g. from 5000 to 20,000cP. When forming beads of ordinary soda-lime glass, it is suitable for the temperature in the firing zone to be of the order of 1000° C.

The invention includes processes wherein the fluid medium and the temperature/time curve relating to the treatment in the firing and cooling zones are such that the drops are wholly or mainly converted to hollow glass beads i.e. beads in which the glass is substantially confined to an outer shell. Such outer shell may be without pores or cells but generally the shell is of microcellular form. Such hollow beads have various important industrial uses, e.g. as filler in concrete and ceramic mixes, due to their low bulk density. The formation of such hollow beads is promoted by rapid heating of the drops and a brief residence time in the firing zone so that droplets of fluid medium are subjected to practically instantaneous surface drying with formation on each droplet of a surface skin. Under the action of the heat, entrapped gas expands causing expansion of the droplets. Rapid vitrification and cooling of the skins prevents their collapse.

While the performance of a process according to the invention generally results in the formation of hollow beads as above referred to, conditions may be such that the resulting beads or a large proportion of them are of porous or solid foam structure throughout their cross-section.

The sizes of the initial drops of the fluid medium influences the sizes of the final beads. Generally speaking, the larger the size of an initial drop the more tendency is there for such drop to become disrupted and transformed under the influence of internal gas pressure into a plurality of smaller drops. This factor enables glass beads of very small sizes to be produced without forming initial drops of the same or smaller order of size.

The invention includes processes as hereinbefore defined wherein the fluid medium, the sizes of the initial drops thereof and the temperature/time curve relating to their treatment in the firing and cooling zones are such that at least some of the drops are disrupted by gas pressure and form droplets of smaller size, and such smaller droplets become converted into glass beads. In certain of such processes according to the invention the initial drops are all or mostly smaller than 500 microns and the glass beads formed therefrom are in the size range 10 to 250 microns.

As an alternative, for forming very small beads, the fluid medium may initially form drops of such small sizes that they are substantially instantaneously dried in the firing zone and undergo conversion to glass beads without exploding or otherwise splitting into smaller droplets. Drops which are of such small sizes, even down to 10 microns in size, can be formed e.g. with the aid of ultrasonic vibrations as will hereafter be exemplified. The invention includes processes in which the drops are initially all or mostly below 100 microns in size.

The invention includes glass beads formed by a process as hereinbefore defined.

The invention also includes fluid media for use in such processes, such media comprising stable solutions of glass forming material. Thus the present invention includes a fluid medium suitable for use as feedstock in the formation of glass beads, such medium comprising an aqueous liquid containing products of reaction of an alkali metal silicate, an acidic boron-containing compound, and a pH modifier inhibiting gel formation. The boron-containing compound is preferably selected from boric acid, boric anhydride and borax.

Such fluid media are particularly suitable for use in glass bead manufacture as hereinbefore defined. The said media can be prepared, stored if need be, and easily sprayed and fired as drops of required sizes depending on the sizes of the glass beads which it is desired to manufacture. The fluid media can be devoid of suspended solid ingredients tending to settle on standing for prolonged periods. If any suspended solid ingredient is present then the homogeneity of the medium can be preserved or restored during or after storage by simple stirring.

Such fluid media also have other potential uses. For example they can be spray-dried at temperatures far below glass-forming temperatures to produce prills of glass-forming material. Such prills can be handled and stored as an intermediate product which can be converted into glass beads by introducing the prills into a furnace at glass-forming temperatures. To assist in formation of such prills, the fluid medium may contain one or more additional ingredients for promoting coherence of the quanta of glass-forming material in the individual drops on spray-drying thereof. However a sufficient binding function will normally be fulfilled by the alkali metal silicate.

In the preparation of such fluid media according to the invention it is necessary, in order to prevent gel formation, to neutralize the acidic boron-containing compound by addition of a base (the pH modifier) before bringing the silicate and boron-containing compound together.

In preferred fluid media according to the invention the pH modifier is sodium or potassium hydroxide.

Particularly advantageous fluid media according to the present invention are those obtained by addition of sodium silicate to neutralized boric acid solution, the boric acid being used in a proportion of more than 25% by weight with respect to the weight of the anhydrous silicate.

The invention includes fluid media as hereinbefore defined wherein the medium contains a solid or dissolved substance or a combination of such substances which will give rise to the evolution of gas on introduction of the medium into a heating zone at spray-drying or glass-forming temperature. Such media are very useful in the production of cellulated glass beads or in the production of spray-dried prills serving as an intermediate product in the formation of such beads. In certain of such media according to the invention the medium contains a solid or dissolved substance which will decompose with evolution of gas on heating of the medium in a said zone. Preferably said gas-evolving substance is a metal carbonate or urea.

A particularly preferred fluid medium according to the invention is one in the preparation of which sodium hydroxide has been employed as a neutralizing agent inhibiting gel formation and the medium incorporates suspended calcium carbonate.

Hollow glass beads made by a process according to the invention have various potential uses due to their low bulk density and thermally insulating properties. By way of example, such hollow beads can be incorporated as filler in concrete, plasters, resins, paints and ceramic materials. The beads can also be used as a loose filling material in cavity walls for thermal insulation purposes, and they can be sintered together to form cellular glass bricks or other structures.

Figure 2:
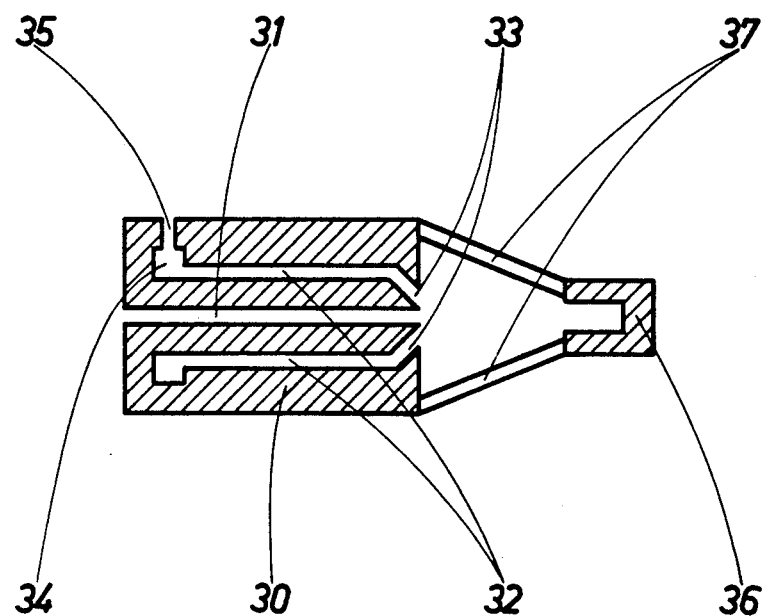

Examples will now be given of processes and fluid medium according to the invention. In the course of these examples, reference will be made to the accompanying diagrammatic drawings in which:

FIG. 1 shows a plant for manufacturing glass beads by a process according to the invention; and FIG. 2 is a diagrammatic longitudinal sectional view of a modified spraying appliance for use in a plant as illustrated in FIG. 1.

EXAMPLE 1

Hollow beads of soda-lime glass were manufactured in a plant as represented in FIG. 1.

This plant comprises four vessels 1, 2, 3 and 4 for holding quantities of starting materials. The vessels have stirrers driven by motors (not shown). Vessel 1 contained an aqueous solution of commercial sodium silicate (38° Baume). Vessel 2 contained an aqueous solution of calcium hydroxide at 80° C. Vessel 3 contained an aqueous solution of sodium carbonate at 80° C. Vessel 4 contained an aqueous solution of urea at 60° C.

Calcium hydroxide solution and sodium carbonate solutions from vessels 2 and 3 were fed into a mixing tank 5 in a ratio corresponding with 2.64 parts by weight of calcium hydroxide per 3.41 parts by weight of sodium carbonate. The solutions were intimately mixed in tank 5 by means of its stirrer and a reaction occurred between the calcium hydroxide and sodium carbonate, resulting in the formation of a solution containing sodium hydroxide, calcium carbonate and a small residual amount of dissolved sodium carbonate.

The solution formed in mixing tank 5 and sodium silicate solution from vessel 1 were fed into a principal mixer 6, such as a mixing tank, likewise fitted with a stirring device, in proportions corresponding with 100 parts by weight of sodium silicate per 2.64 parts by weight of calcium hydroxide and per 3.41 parts by weight of sodium carbonate. At the same time water was fed into the mixer 6 via supply line 7 to bring the viscosity of the fluid medium in the mixer to 2,300 centipoises.

On a first run, a valve 8 between the vessel 4 and the mixer 6 was closed so that urea was not used in the process.

The fluid medium formed in tank 6 contained dissolved sodium silicate and sodium hydroxide, and calcium carbonate in suspension. In the formation of glass beads from this fluid medium as will now be described, those three constituents together served as glass-forming material and the calcium carbonate additionally served as a cellulating agent.

The fluid medium was fed from mixer 6 via line 9 into a container 10 fitted with a stirrer, in which container the viscosity of the medium was measured. Depending on this measurement the flow of water into the mixer 6 via the water supply line 7 was regulated so as to keep the viscosity of the fluid medium at about 2,300 cP. After passing through a filter 11, the fluid medium was delivered by a pump 12 to spray heads 13 in which the fluid medium was atomized by means of compressed air delivered via air line 14 from a compressor 15. The spray heads 13 discharged the fluid medium as drops smaller than 500 microns in size. The drops were discharged directly upwardly into a furnace 16 fired by gas burners 17 located at the furnace base. The gas temperature at the bottom of the furnace was 1100° C.

On contact with the ascending currents of hot gas in the furnace many of the drops of fluid medium became disrupted by internal pressures generated by evaporation of water and decomposition of calcium carbonate and formed drops of still smaller sizes. All of the drops were carried upwardly within the furnace by the hot gas streams. During their ascent, and as the temperature of the drops increased toward 750° C, solid material in the individual drops became converted to a vitreous skin or envelope. At the same time expansion of gas entrapped in the drops increased their volumes. The approximate average residence time of the drops within the furnace was 2 seconds.

The drops, in the form of hollow glass beads, were discharged from the top of the furnace into a conduit 18 leading tangentially into a cyclone separator 19 having a central top opening 20 for the discharge of gases and a bottom apex aperture 21 for the discharge of the beads. During their movement along conduit 18 and within the cyclone separator, the beads became cooled sufficiently for them to be collectable in bulk without mutual adherence of the beads. The beads were discharged from the cyclone separator into a hopper 22 and from there onto a conveyor 23 for transportation to a delivery point where they could be stored or packaged or put directly to industrial use.

The hollow glass beads were composed of glass of the following approximate composition by weight:

$SiO_2$ — 70%
$Na_2O$ — 25%
$CaO$ — 5%

The hollow beads were mostly in the size range between 10 and 250 microns and they had a bulk density of 0.1 to 0.3 g/cm$^3$. The majority of the beads were formed by microcellular shells.

On a second run, the same processing conditions were observed but the valve 8 was opened to cause urea to be introduced into the composition of the fluid medium formed in mixer 6 in a proportion of approximately 3% by weight based on the weight of the sodium silicate. Hollow glass beads were formed as in the first run but they had a slightly lower bulk density.

EXAMPLE 2

The plant represented in FIG. 1 was used for forming hollow glass beads in the following manner.

Vessel 1 contained finely divided silica as marketed under the trademark FARSIL 28 by Sanson S.A. of France, dissolved in an aqueous solution of sodium hydroxide at 80° C and containing 4.3 kg of sodium hydroxide per 12.9 liters of water. Vessel 4 contained an aqueous solution of urea at 60° C, containing 200g of urea per 10 liters of water.

Vessels 2 and 3 contained respectively an aqueous solution of calcium hydroxide and an aqueous solution of sodium carbonate, both solutions being at 80° C.

The solutions from vessels 2 and 3 were fed into mixing tank 5 in proportions corresponding with 3.707 kg of sodium carbonate per 1.545 kg of calcium hydroxide. In the tank 5 a reaction took place with formation of sodium hydroxide and a precipitate of calcium carbonate. A small excess amount (about 1%) of the sodium carbonate remained in solution.

The contents of tank 5, the silica solution from vessel 1, and the urea solution from tank 4 were introduced into the mixer 6 in proportions corresponding with 10 kg of silica per 3.707 kg of sodium carbonate, per 1.545 kg of calcium hydroxide, and per 500 g of urea. The temperature of the fluid medium in the mixer 6 and during its delivery to the furnace 16 was maintained at 80° C. and water was fed into the mixer 6 at a rate which maintained the viscosity of the fluid medium at 2,000 cP. Under those conditions the silica, sodium hydroxide and urea remained in solution whereas the calcium carbonate formed a disperse phase of the medium.

The fluid medium was sprayed into the furnace 16 as in Example 1.

The product collected from the apex of the cyclone separator consisted of glass beads all or most of which were hollow and in the size range 10 to 500 microns. The glass shells of most of the beads contained microcells. The glass of which the beads were composed had the following approximate composition by weight:
$SiO_2$ — 60%
$Na_2O$ — 33%
$CaO$ — 7%

When the foregoing example was modified by replacing a part or the whole of the calcium hydroxide starting material, by hydrated magnesium ($Mg(OH)_2$) and/or hydrated alumina ($Al_2O_3 \cdot 3H_2O$) similar results were obtained, but with corresponding modification of the composition of the glass. Similar results to those obtained in that example were also achieved when part of the sodium carbonate starting material was replaced by potassium carbonate.

EXAMPLE 3

Plant as represented in FIG. 1 was employed for manufacturing hollow glass beads in the following manner.

The vessels 1 and 4 contained respectively a commercial sodium silicate solution of 38° Be and an aqueous suspension of precipitated calcium hydroxide. Vessels 2 and 3 were not used. The calcium hydroxide suspension contained 100 g of calcium hydroxide per 200 cc of water. The calcium hydroxide suspension was mixed in mixer 6 with the sodium silicate solution fed from vessel 1 in proportions corresponding with 100 g of calcium hydroxide in 200 cc of water per kilogram of sodium silicate.

The sodium silicate solution and the calcium hydroxide suspension in vessels 1 and 4, also the mixture in mixer 6 were maintained at a temperature of 90° C. The viscosity of the mixture in mixer 6 was maintained at 100 cP.

The fluid medium formed in mixer 6 was sprayed into the furnace 16 and conversion to glass beads took place as in Example 1. The furnace temperature, at its hottest zone, was 1000° C. The drops discharged into the furnace were below 400 microns in size.

The product collected from the cyclone separator 19 was constituted by glass beads the majority of which were hollow beads below 350 microns in size, formed from droplets formed by bursting of the drops initially sprayed into the furnace. The glass forming the beads had the following approximate composition by weight:
$SiO_2$ — 64%
$Na_2O$ — 21%
$CaO$ — 14%

The beads had a bulk density of the order of 0.3g/cm³.

In a modification of the foregoing process, the calcium hydroxide was replaced by magnesium hydroxide and hydrated aluminia. Similar results were obtained except for the modification of the glass composition consequent upon the modification of the starting material.

EXAMPLE 4

Sodium borosilicate glass beads were produced in the following manner in plant as represented in the accompanying drawing.

The vessel 1 contained an aqueous solution of commercial sodium silicate (38° Be). Vessels 2 and 3 respectively contained an aqueous solution of calcium hydroxide and an aqueous solution of sodium carbonate, both solutions being at 80° C. These solutions were fed into mixing tank 5 in proportions corresponding with 640 g of sodium carbonate per 310 parts by weight of calcium hydroxide. In tank 5 a reaction occurred resulting in the formation of a solution of sodium hydroxide containing suspended calcium carbonate.

The contents of tank 5 were fed into the principal mixer 6 together with aqueous silicate solution from vessel 1, an aqueous solution of boric acid at 80° C. and containing 830 g of acid per 5 liters of water, from vessel 4, and an aqueous solution of sodium nitrate containing 200 g of the salt per 3 liters of water, which was fed in from a further storage vessel (not shown). The supply streams to mixer 6 correspond with 10 kg of sodium silicate per 640 g of sodium carbonate per 310 g of calcium hydroxide per 830 g of boric acid per 200 g of sodium nitrate.

The viscosity of the fluid medium in mixer 6 was adjusted by addition of water as required to maintain a value of 1,200 cP.

The fluid medium was sprayed into furnace 16 as drops from 50 to 250 microns in size. The furnace temperature at its hottest zone was 950° C. On contact of the drops with the hot ascending gas streams in the furnace, all or most of the drops split into a plurality of smaller drops.

Borosilicate glass beads in the size range 10 to 300 microns were collected from the cyclone separator 19. Nearly all of the beads were of hollow structure comprising microcellular shells. The bulk density of the beads was 0.1 to 0.2 g/cm³. The beads were composed of a borosilicate glass of the following approximate composition by weight:
$SiO_2$ — 60%
$Na_2O$ — 25%
$B_2O_3$ — 10%
$CaO$ — 5%

In another run the foregoing conditions were modified by replacing the boric acid in vessel 4 by borax. This involved a corresponding modification of the composition of the borosilicate glass but otherwise the results were similar.

EXAMPLE 5

Sodium borosilicate glass beads were produced in the following manner using the plant as represented in FIG. 1 of the accompanying drawing.

The vessel 1 contained a hot solution in caustic soda (80° C) of fine silica as marketed under the trademark FARSIL 28 by Sanson S.A. of France. The solution contained 4.3 kg of silica per 12.9 liters of water.

The vessels 2 and 3 respectively contained an aqueous solution of calcium hydroxide and an aqueous solution of sodium carbonate, both solutions being 80° C. Solutions from these vessels were fed into mixing tank 5 in proportions corresponding with 2.84 kg of sodium carbonate per 1.85 kg of calcium hydroxide. In tank 5 a reaction occurred resulting in an aqueous solution of sodium hydroxide containing suspended calcium carbonate.

The solution from tank 5 was fed into the principal mixer 6 together with hot silica solution from vessel 1 and an aqueous solution of boric acid at 60° C contained in vessel 4, the solution containing 6.24 kg of the acid per 30 liters of water. The mixing ratio in the mixer 6 corresponded with 4.3 kg of silica per 2.84 kg of sodium carbonate per 1.85 kg of calcium hydroxide per 6.24 kg of boric acid.

The viscosity of the fluid medium in mixer 6 was maintained at 2,500 cP.

The fluid medium was sprayed into furnace 16, whose maximum temperature was 900° C. On contact with the hot ascending gases in the furnace most of the drops of fluid medium exploded, to form smaller drops.

Borosilicate glass beads were collected from the cyclone separator 19. These beads were in the size range 10 to 250 microns. Most of them were of hollow structure with microcellular shells, and their bulk density was 0.2 to 0.3 g/cm³. The borosilicate glass had the following approximate composition by weight:

$SiO_2$ — 50%
$Na_2O$ — 25%
$B_2O_3$ — 18%
$CaO$ — 7%

EXAMPLE 6

Sodium borosilicate glass beads were formed in the following manner in the plant represented in FIG. 1 of the accompanying drawing.

Vessel 1 contained an aqueous solution of commercial sodium silicate (38° Baume).

Vessel 2 contained an aqueous solution of boric acid at 80° C. Vessel 3 contained an aqueous solution of sodium hydroxide of 50% concentration at 80° C.

Boric acid solution and sodium hydroxide solution from vessels 2 and 3 were fed into mixing tank 5 in order to form in this tank a neutral solution. This neutral solution was supplied to the principal mixer 6 together with sodium silicate solution from vessel 1, an aqueous solution of urea from vessel 4, and water via supply line 7. The urea solution contained 200 g of urea per 10 liters of water and was at a temperature of 60° C. The mixing ratio in mixer 6 corresponded with 10 kg of sodium silicate per 1.1 kg of boric acid per 200 g of urea and the addition of water was regulated to give the fluid medium in mixer 6 a viscosity of 500 cP.

Due to the neutralization of the acid by the sodium hydroxide the fluid medium in mixer 6 showed no tendency toward gel formation.

The fluid medium was sprayed into furnace 16 as drops below 500 microns in size. The temperature at the bottom of the furnace was 1000° C. Under the action of the ascending hot gas streams most of the drops entering the furnace exploded, forming drops of smaller sizes.

Hollow glass beads comprising microcellular shells were collected from the cyclone separator 19. The beads were below 250 microns in size and had a bulk density from 0.1 to 0.2 g/cm³. The approximate composition by weight of the borosilicate glass forming the beads was:

$SiO_2$ — 65.5%
$Na_2O$ — 19.5%
$B_2O_3$ — 15%

Hollow beads of a range of different borosilicate glasses can be formed by increasing or decreasing the proportion of boric acid used in the composition of the fluid medium in the foregoing example and provided the proportion of sodium hydroxide used is correspondingly varied to insure neutralization of the medium, gel formation will be avoided. By way of example the boron oxide content of the formed glass could be increased to above 50% by increasing the proportion of boric acid in the fluid medium and in that case the glass has a lower softening temperature so that lower furnace temperatures could be used.

A further possible modification of the foregoing example resides in the use of calcium hydroxide as base instead of the sodium hydroxide. Another possible modification involves the addition of sodium aluminate, e.g., in a proportion of 100 g per 10 kg of sodium silicate, so as to improve the chemical resistance of the hollow glass beads produced in the process.

EXAMPLE 7

Borosilicate glass beads were produced in the plant as shown in FIG. 1.

The vessel 1 contained a solution formed by dissolving finely divided silica as marketed under the trademark FARSIL 28 in a solution of caustic soda at 90° C. The solution contained 1 kg of silica per 430 g of caustic soda and 1.3 kg of water.

The vessel 4 contained a solution of borax in water in a concentration corresponding with 800 g of borax per 3 liters of water.

The two solutions were mixed in mixer 6 in proportions corresponding with 800 g of borax per killogram of silica. The mixture formed a gel. This gel was converted to a solution by heating the contents of the mixer 6 to 90° C. and agitating the mixture for 1 to 4 hours by means of a rotary agitator rotating at about 2000 revolutions per minute.

The solution formed in that way had a viscosity of about 50 cP. The solution was sprayed into the furnace 16 and conversion to glass beads took place as in Example 1. The drops discharged into the furnace were less than 100 microns in size.

The borosilicate glass beads collected from cyclone 19 were hollow. The glass composition in percentages by weight was approximately as follows:

$SiO_2$ — 61.5%
$Na_2O$ — 20.3%
$B_2O_3$ — 18.2%

The beads were less than 150 microns in size and had a bulk density of the order of 0.4 g/cm³.

EXAMPLE 8

Sodium borosilicate beads were formed using the plant as described with reference to FIG. 1 of the accompanying drawings.

Vessel 1 contained finely divided silica as marketed under the trademark FARSIL 28, dissolved in a hot aqueous solution of sodium carbonate. The silica and sodium carbonate were present in proportions corresponding with 10 kg of silica per 7.35 kg of sodium carbonate per 24 liters of water. The solution was at 80° C.

Vessel 2 held an aqueous solution of boric acid at 60° C, containing 5.19 kg of the acid per 40 liters of water.

Vessels 3 and 5 were not used. The contents of vessels 1 and 2 were fed into principal mixer 6 in proportions corresponding with 10 kg of silica per 5.19 kg of boric acid, and water was added via supply line 7 to bring the viscosity of the fluid medium in the mixer to 1,000 cP.

In order to avoid gel formation, the contents of the mixer were maintained at a temperature of 90° C. and vigorously stirred for a period of 1 hour.

The fluid medium at the said temperature was sprayed into furnace 16 in which the bottom temperature was 1,100° C. Most of the drops of fluid medium were disrupted on entering the furnace to form a larger number of drops of smaller sizes.

Sodium borosilicate glass beads of hollow form were collected from the cyclone separator 19. The beads were in the size range 10 to 250 microns and had a bulk density of 0.25 g/cm³.

The glass forming the beads had the following approximate composition by weight:
 $SiO_2$ — 58%
 $Na_2O$ — 25%
 $B_2O_3$ — 17%

In a second run, the foregoing example was modified by feeding a hot aqueous solution of urea at 60° C into the mixer 6 in a proportion corresponding with 500 g of urea per 10 kg of silica. In this case the formed hollow glass beads were found to have a bulk density of 0.17 g/cm³.

In a further modification of the foregoing example, an aqueous solution of sodium silicate of 40% concentration of 38° Baume was used as starting material in vessel 1, instead of the solution of silica in caustic soda. The sodium silicate solution was kept at 80° C. This sodium silicate solution was mixed in mixer 6 with boric acid solution from vessel 2, and with aqueous urea solution at 60° from vessel 4, in proportions corresponding with 1 kg of sodium silicate per 0.620 kg of boric acid and per 20 g of urea, and water was added to bring the viscosity of the fluid medium in mixer 6 to 3,000 cP. In order to avoid gelification of the medium the contents of the mixer were heated to 90° C and agitated over a period of 8 hours. This fluid medium was then sprayed into the furnace under the same conditions as those in the foregoing example. Hollow sodium silicoborate glass beads of a similar size range and bulk density were obtained, the beads being formed of glass having the following approximate composition by weight:
 $B_2O_3$ — 50%
 $SiO_2$ — 28.6%
 $Na_2O$ — 11.4%

EXAMPLE 9

Silicoborate glass beads were manufactured in apparatus similar to that shown in FIG. 1 but with the following modification.

The spray heads 13 at the bottom of the furnace were replaced by atomizers of the form represented in FIG. 2 of the drawings which shows one atomizer or spray head in diagrammatical longitudinal cross-section. The atomizer comprises a body 30 defining a central passageway 31 and a plurality of secondary passageways 32 (of which two appear in the drawing) annularly spaced in parallel relation around the axis of passageway 31. In use, fluid medium is forced into the body 30 so as to flow along passageway 31 from left to right as shown in FIG. 2 of the drawings. The secondary passageways 32 are provided with exit end portions 33 which converge so as to terminate in the immediate vicinity of the exit end of the central passageway 31. An annular chamber 34 is common to the feed ends of aforesaid secondary passageways 32 and a radial feed channel 35 leads into this annular chamber from the periphery of the body 30. Downstream from the exit ends of the passageways 31 and 33 there is a hub or cap portion 36 which is connected to the body 30 by strips 37 which are angularly spaced around the longitudinal axis of the sprayer.

When the central passageway 31 on the one hand and the secondary passageways 32 on the other hand are fed under pressure with streams of different fluid media, the streams collide adjacent the exit ends of the passageways while at the same time a part of the formed fluid mixture strikes the hub or cap portion 36 and the impact creates an ultrasonic vibrationary field which causes division of the fluid mixture into very small droplets, for example of the order of one or several dozens of microns. Atomizers or so-called pulverizators of this type are commercially available. For example, suitable pulverizators are marketed under the trademark SONICORE by Ultrasonic Corporation of the United States of America.

In the process the subject of this Example, vessel 1 contained a 40% aqueous solution of sodium silicate at 38° Be, maintained at a temperature of 90° C. The vessel 2 contained a solution of boric acid containing a 5.19 kg of acid per 40 liters of water and maintained at a temperature of 60° C. Vessel 3 contained a urea solution at 60° C.

The boric acid solution from vessel 2 was mixed with the urea solution from vessel 3 in tank 5.

The feed end of the central passageway 31 of each atomizer was connected to vessel 1 via a pump, while the radial feed channel 35 of each atomizer, feeding the associated secondary passageways 32 through the associated annular chamber 35, was connected to vessel 5, also via a pump. The mixing ratio between the boric acid and the urea in tank 5 and the rates of supply of the solutions from vessel 1 and tank 5 to the atomizers were such as to achieve in each atomizer a mixing ratio corresponding with 0.62 kg of boric acid per 20 g of urea per kilogram of sodium silicate.

The droplets discharging from the atomizers were of the order of 50 microns in size. Although the drops combined boric acid and sodium silicate, gel formation did not occur. The drops were transformed very rapidly under the heat of the furnace into hollow glass beads. The beads were less than 70 microns in size. The glass had the following approximate composition in percentages by weight:
 $B_2O_3$ — 50%
 $SiO_2$ — 28.6%
 $Na_2O$ — 11.4%

Certain examples of stable fluid media according to the present invention have already been incorporated in Examples 4 to 6. Those media are very suitable, not only for use in processes according to the invention wherein the medium is directly formed into hollow glass beads, but also in other processes, e.g., in processes wherein drops of the fluid medium are treated at temperatures sufficient to dry them and convert them to solid prills but insufficient to convert them into glass beads. The following are further examples of the preparation of fluid media according to the invention which can be used in either of such ways.

EXAMPLE 10

6.5 kg of NaOH flakes were dissolved in 6.5 kg of water at 50° C. 11.6 kg of boric acid were then added to this solution. The boric acid was neutralized by the NaOH by an exothermic reaction. 2 kg of urea were then dissolved in the resulting hot solution. This solution containing the neutralized acid and the urea, was mixed with 100 kg of sodium silicate of 38° Baume.

The liquid medium resulting from the foregoing steps is useful as a feedstock for the preparation of solid prills of borosilicate glass-forming material. The fluid medium shows no tendency to gel formation so that special measures, such as prolonged agitation and heating to high temperatures, are not necessary for maintaining the fluid medium in a fluid condition in which it can be easily divided into drops. By way of example solid prills of borosilicate glass-forming material can be produced by spray-drying the fluid medium. It suffices to spray the medium into a drying shaft in which the drops are dried by ascending currents of hot gases at temperatures causing rapid evaporation of the water, e.g. temperatures in the range 300° to 550° C. The resulting prills can be collected and packaged or stored, or transported to a following processing stage. The prills can be converted to hollow beads of borosilicate glass by firing them at glass-forming temperatures.

The quantity of boric acid used per 100 kg of sodium silicate can be varied provided that the quantity of caustic soda used in each case is appropriate for neutralizing the solution before addition of the sodium silicate.

The caustic soda could be entirely or in part replaced by another base.

EXAMPLE 11

1.75 kg of NaOH flakes were dissolved in 1.75 kg of water at 50° C. 2.7 kg of boric acid were then added to this solution. The boric acid was neutralized by the NaOH. 2 kg of urea were then dissolved in the resulting hot solution. This solution, containing the neutralized acid and the urea, was mixed with 100 kg of sodium silicate of 38° Baume.

The fluid medium according to the invention, produced by the foregoing step, is less costly than the medium prepared according to Example 10. Like that medium, it does not form a gel and it can therefore also be easily prepared and sprayed. The medium can be spray-dried to form prills of borosilicate glass-forming material for conversion to borosilicate glass in a subsequent processing stage, or can be converted to borosilicate glass beads by spraying the fluid medium directly into a heating zone at glass-forming temperature.

What is claimed is:

1. A process of making glass beads which comprises the steps of forming a fluid medium comprising an aqueous liquid having glass-forming material therein at least most of which is dissolved in the aqueous liquid, forming drops of such fluid medium, and directly converting the drops to glass beads by causing the drops to travel in separated condition first through a firing zone at glass-forming temperature to cause evaporation of liquid and formation of glass from the glass-forming material while still within said firing zone, and then through a cooling zone to cause the glass to solidify.

2. A process as defined in claim 1 wherein said fluid medium contains at least 60% by weight of water.

3. A process as defined in claim 1 wherein said glass-forming material forms a borosilicate or silicoborate glass.

4. A process as defined in claim 1 wherein said glass-forming material normally forms a gel and wherein said fluid medium contains a dissolved ingredient which inhibits such gel formation.

5. A process as defined in claim 1 wherein said fluid medium contains products of reaction of an alkali metal silicate, an acidic boron-containing compound, and a pH modifier which inhibits gel formation.

6. A process as defined in claim 5, wherein said pH modifier is sodium or potassium hydroxide.

7. A process as defined in claim 1 wherein said fluid medium contains a substance giving rise to the evolution of gas in the firing zone.

8. A process as defined in claim 1 wherein said fluid medium contains a substance which decomposes in the firing zone with evolution of gas.

9. A process as defined in claim 8 wherein said substance comprises a metal carbonate.

10. A process as defined in claim 8 wherein said substance comprises urea.

11. A process as defined in claim 1 wherein said drops are formed by feeding said fluid medium to sprayer means from which the fluid medium issues as said drops.

12. A process as defined in claim 1 wherein said fluid medium and said drops are formed simultaneously by delivering separate fluid streams containing different constituents of the fluid medium into one or more gas streams in which the materials of the different fluid streams coalesce in the form of drops.

13. A process as defined in claim 1 wherein said drops are substantially entirely of a size not exceeding 2mm in diameter.

14. A process as defined in claim 13 wherein said drops not exceeding 2 mm are of a size range 0.01 to 1.0 mm.

15. A process as defined in claim 1 wherein the temperature in the firing zone corresponds with a glass viscosity of 5000 to 20,000 cP.

16. A process as defined in claim 1 wherein said fluid medium and the temperature/time curve relating to the treatment in the firing and cooling zones are such that the drops are at least mainly converted to hollow glass beads.

17. A process as defined in claim 1 wherein said fluid medium, the sizes of the drops thereof, and the temperature/time curve relating to their treatment in the firing and cooling zones are such that at least some of the drops are disrupted by gas pressure and form droplets of smaller size, and such smaller droplets become converted into glass beads.

18. A process as defined in claim 17 wherein said drops are at least mostly smaller than 500 microns and the glass beads formed therefrom are in the size range 10 to 250 microns.

19. A process as defined in claim 1 wherein said drops are at least mostly below 100 microns in size.

* * * * *